United States Patent
Jakli et al.

(10) Patent No.: US 6,924,009 B2
(45) Date of Patent: Aug. 2, 2005

(54) ELECTRO-OPTICAL DEVICES FROM BANANA-SHAPED LIQUID CRYSTALS

(75) Inventors: Antal Jakli, Kent, OH (US); Liang-Chy Chien, Stow, OH (US); Daniel Krüerke, Dunfermline (GB); Hans Sawade, Berlin (DE); Gerd Heppke, Berlin (DE)

(73) Assignee: Kent State University, Kent, OH (US)

( * ) Notice: Subject to any disclaimer, the term of this patent is extended or adjusted under 35 U.S.C. 154(b) by 0 days.

(21) Appl. No.: 10/415,043
(22) PCT Filed: Oct. 26, 2001
(86) PCT No.: PCT/US01/48021
§ 371 (c)(1),
(2), (4) Date: Jul. 30, 2003
(87) PCT Pub. No.: WO02/34861
PCT Pub. Date: May 2, 2002

(65) Prior Publication Data
US 2004/0033321 A1 Feb. 19, 2004

(51) Int. Cl.$^7$ ............................ C09K 19/02; G02F 1/133
(52) U.S. Cl. .................... 428/1.1; 252/299.01; 349/168; 349/172; 349/174
(58) Field of Search ...................... 252/299.01, 299.67; 349/168, 172, 174; 428/1.1

(56) References Cited

U.S. PATENT DOCUMENTS 6,130,739 A  10/2000  Shimoshikiryo et al. .... 349/182

FOREIGN PATENT DOCUMENTS

JP    XP-002209488    4/2000
JP    2001303058    * 10/2001

OTHER PUBLICATIONS

English translation by computer for JP 2001–303058, http://www4.ipdl.ncipi.go.jp/Tokujitu/PAJdetail.ipdl?N0000=60&N0120=01&N2001=2&N3001=2001-303058.*
CAPLUS 2003:355372.*
Tomoko Sekine, T. Niori, J. Watanabe, T. Furukawa, S.W.Choi, and H. Takezoe, "Spontaneous Helix Formation in Smectic Liquid Crystals Comprising Achiral Molecules", *J. Mater. Chem.*, 1997, 7(8), pp. 1307–1309.

(Continued)

*Primary Examiner*—Shean C. Wu
(74) *Attorney, Agent, or Firm*—Fay, Sharpe, Fagan, Minnich & McKee, LLP

(57) ABSTRACT

A liquid crystal device comprising tilted smectic phases of banana-shaped liquid crystal molecules is disclosed. A method for fabricating a light modulating device is also disclosed. The method comprises the steps of providing a pair of substrates with a cell gap therebetween and permanently disposing at least one banana-shaped liquid crystal material into said cell gap. The present invention also provides a method of generating an image, comprising providing a pair of substrates with a cell gap therebetween, providing transparent electrodes on each of the substrates adjacent to the cell gap, disposing at least one banana-shaped liquid crystal material into the cell gap; and applying an electric field across the electrodes. The tilted smectic phases of banana-shaped liquid crystal may be in either a racemic or a chiral state. The application of a sufficiently high electric field transitions the banana-shaped liquid crystal material between the racemic and chiral states, and both the racemic and the chiral states are stable in the absence of an electric field.

22 Claims, 11 Drawing Sheets

OTHER PUBLICATIONS

Darren R. Link, Giorgio Natale, Renfan Shao, Joseph E. Maclennan, Noel A. Clark, Eva Körblova, and David M. Walba, "Spontaneous Formation of Macroscopic Chiral Domains in a Fluid Smectic Phase of Achiral Molecules", *Science,* vol. 278, Dec. 12, 1997, pp. 1924–1927.

G. Pelzl, S. Diele, S. Grande, A. Jakli, Ch. Lischka, H. Kresse, H. Schmalfuss, I. Wirth and W. Weissflog, "Structural and Electro–Optical Investigations of the Smectic Phase of Chlorine–Substituted Banana–Shaped Compounds", *Journal of Liquid Crystals,* vol. 26, No. 6, 1999, 401–413.

G. Heppke, A. Jakli, S. Rauch and H. Sawade, "Electric–Field–Induced Chiral Separation in Liquid Crystals", *Physical Review E,* vol. 60, No. 5, Nov., 1999, pp. 5575–5579.

Gerhard Pelzl, Siegmar Diele, and Wolfgang Weissflog, "Banana–Shaped Compounds—A New Field of Liquid Crystals", *Advanced Materials,* vol. 11, No. 9, 1999, pp 707–724.

Gerd Heppke and Dirk Moro, "Chiral Order from Achiral Molecules", *Science,* vol. 279, Mar. 20, 1998, pp. 1872–1873.

A. Jakli, S. Rauch, D. Lötzsch, and G. Heppke, "Uniform Textures of Smectic Liquid–Crystal Phase Formed by Bent–Core Molecules", *Physical Review E,* vol. 57, No. 6, Jun. 1998, pp. 6737–6740.

\* cited by examiner

FIG-7A　　　　FIG-7B
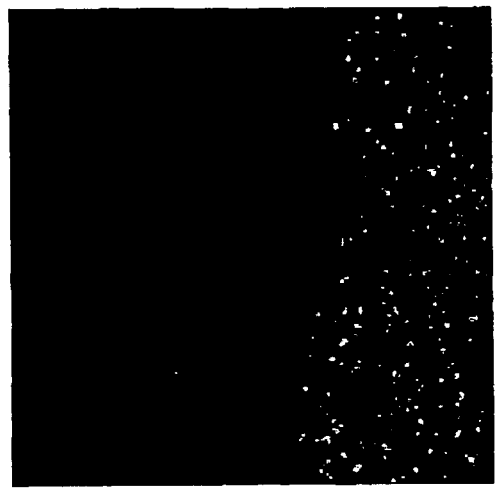
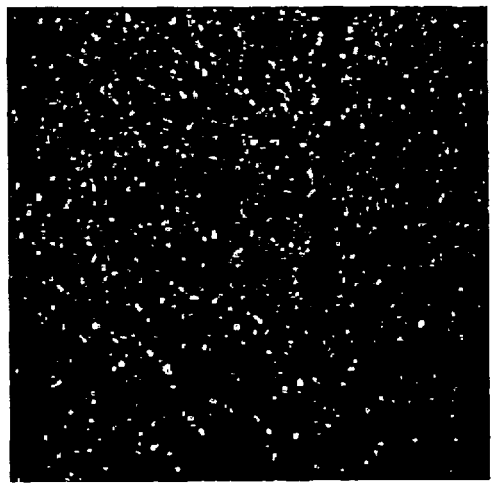
OFF　　　　　　ON
FIG-8A　　　　FIG-8B 0V (CLEAR)

30V (SCATTERING)

0V (CLEAR)

30V (CLEAR)

ELECTRO-OPTICAL DEVICES FROM BANANA-SHAPED LIQUID CRYSTALS

This application claims benefit of pending U.S. Provisional Application No. 60/243,371 filed on Oct. 26, 2000.

GOVERNMENT RIGHTS

The United States Government has a paid-up license in this invention and may have the right in limited circumstances to require the patent owner to license others on reasonable terms as provided for by the terms of Grant DMR8920147-14, awarded by the National Science Foundation.

TECHNICAL FIELD

The present invention resides in the art of electro-optical liquid crystal devices made with banana-shaped molecules. These devices, which may be used for electro-optical switching and electro-optical storage using liquid crystal devices, utilizes the tilted smectic phase of banana-shaped molecules.

BACKGROUND OF THE INVENTION

Liquid crystal materials are materials which occupy an intermediate state between crystalline solid materials and isotropic liquid materials. Liquid crystal materials, while exhibiting an orientational order, do not typically exhibit a positional order. The unique properties of liquid crystal materials have enabled their use in a variety of display applications. Among the useful properties of liquid crystal materials in display applications are the reflection and refraction of light by the liquid crystal (LC) and the ability of the user to influence these properties. These properties are governed by the orientation of the molecules which comprise the liquid crystal. The orientation of individual molecules often determines the behavior of layers and phases of these molecules.

The lack of mirror symmetry of individual molecules is described as the chirality or "handedness" of the molecule. Many liquid crystal phases are chiral due to the introduction of chirality of the same sign at the molecular level. Examples of these types of chiral liquid crystal phases include cholesteric, blue, Twist Grain Boundary (TGB) and smectic C* phases. Due to the long-range orientation order of liquid crystalline phases, and the chirality of the molecules, a spontaneous twist occurs in a micrometer range. The chirality transfers from a molecular to mesoscopic range, and the phase becomes chiral.

Two molecules that are identical in composition yet are mirror images of each other are described as having opposite chirality. This is generally expressed as the molecules being left-handed or right-handed depending on their particular orientation. Liquid crystal molecules having the same chemical formula but opposite chirality will behave in optically similar, but oppositely directed ways.

Scattering type devices are very well known in liquid crystal displays. Two known types are polymer dispersed liquid crystals (PDLC), and polymer network containing liquid crystals (PNLC). Liquid crystal polymer dispersions form a broad class of materials in which the weight concentration of polymer ranges from 2% to 90%, depending on the application and type of polymer used. Dispersions, wherein the liquid crystal forms nearly spherical droplets randomly distributed throughout a polymer matrix, and the polymer concentration is 20% or more, are normally referred to as polymer dispersed liquid crystals (PDLC). Normally, PDLCs are light scattering in the "off" state and transparent in the "on" state. It is also possible to make reverse mode PDLCs. The display modes, however, cannot be interchanged.

PNLCs are formed by photopolymerization of a mixture containing less than 10% of a reactive monomer in an aligned liquid crystal host, such as a nematic, ferroelectric, or cholesteric phase liquid crystal material. The alignment may be assisted by surface alignment layers or by external fields. The polymerization induces phase separation of an initially homogeneous mixture. The morphology of the polymer network depends on the orientational order of the liquid crystal, properties of the monomer, and the presence of external aligning fields and/or conventional alignment layers applied to the cell surfaces. Normally, PNLCs work as reverse mode PDLCs. It is also possible to make PNLCs that are opaque at zero fields. Once made, however, the display modes cannot be interchanged. The switching times in PDLCs and PNLCs are typically over a millisecond, which is not optimal for most video applications. Moreover, the viewing angle and transmittance of the clear state are limited.

In light of the foregoing, it is evident that there is a need in the art for an electro-optical liquid crystal device which has faster switching times, a wider viewing angle, and improved transmittance of the clear state. It would be additionally advantageous if the liquid crystal device contained electro-optical storage functionality.

BRIEF SUMMARY OF THE INVENTION

In light of the foregoing, it is a first aspect of the present invention to provide a liquid crystal display device having faster switching times, a wider viewing angle, and improved transmittance of the clear state.

It is a further aspect of the present invention to provide a liquid crystal device capable of electro-optical storage functionality.

The aspects of the invention are achieved by a liquid crystal display device comprising the tilted smectic phase of banana-shaped liquid crystal molecules. In one embodiment of the invention, a cell is provided containing the racemic state of banana-shaped liquid crystal molecules. As used herein, a banana-shaped LC domain is referred to as racemic if the chirality of the layers generally alternates from one layer to the next. The cell is opaque at zero field, and clear when an electric field of sufficient magnitude is applied. The clear state is clear in any direction, hence these cells have a very wide viewing angle. This is a tilt separation mode liquid crystal device (TSM-LCD).

In a second embodiment of the invention, a cell is provided containing the chiral state of the banana-shaped molecules. As used herein with respect to domains of banana-shaped liquid crystal, the term chiral indicates that adjacent layers of liquid crystal generally have the same chirality or handedness. A cell with a chiral layer arrangement is clear under zero fields, and becomes opaque when an electric field of sufficient magnitude is applied. The switching time is more than an order of magnitude faster than the switching time for PDLCs. This type of arrangement is used in a chiral separation mode liquid crystal device (CSM-LCD).

In a third embodiment, a cell is provided containing racemic and chiral state banana-shaped molecules. By applying an electric field, the racemic state is converted to the chiral state, or the chiral state is converted to the racemic state. Both states are stable at zero field. In other words, the LC material may be driven to either state with an applied electric field, and when the field is removed, the state remains indefinitely. The racemic state is opaque and the chiral state is clear. This cell is suitable as an electro-optical storage device or an electro-optical switching device.

The present invention also provides a method for fabricating a light modulating device, the method comprising the steps of providing a pair of substrates with a cell gap therebetween, and permanently disposing at least one banana-shaped liquid crystal material into the cell gap.

The present invention also provides a method of generating an image, comprising providing a pair of substrates with a cell gap therebetween, providing transparent electrodes on each of the substrates adjacent to the cell gap, permanently disposing at least one banana-shaped liquid crystal material into the cell gap; and applying an electric field across the electrodes to obtain a desired optical state.

These and other aspects of the present invention, as well as the advantages thereof over existing prior art forms, which will become apparent form the description to follow, are accomplished by the improvements hereinafter described and claimed.

BRIEF DESCRIPTION OF THE SEVERAL VIEWS OF THE DRAWINGS

For a complete understanding of the objects, techniques and structure of the invention, reference should be made to the following detailed description and accompanying drawings, wherein:

FIG. 7 is a photomicrograph of use of the B2 banana phase as an electrically switchable light shutter, utilizing a 10-$\mu$m EHC cell with 1 cm² active area of material #1 at room temperature;

FIG. 8 is a photomicrograph of a cell according to the present invention at room temperature in reflection at zero voltage and at 40V;

DETAILED DESCRIPTION OF THE INVENTION

Tilted smectic phases of achiral banana-shaped liquid crystal molecules have been observed. Banana-shaped or "bent core" liquid crystal molecules are individually symmetric and therefore have no chirality individually. Nonetheless, it has been observed that they can arrange in layers that exhibit chirality. It is believed that this behavior is due to spontaneous symmetry breaking which has been observed in tilted smectic phases of bent-core, banana-shaped molecules. This phase, sometimes called the B2 phase, is a 2-dimensional fluid. The molecules adopt a uniform tilt relative to the layer polarization, which is determined by the two-fold symmetry axis. Due to the tilt and the polar packing of the molecules, the layers have no reflection symmetry and are therefore chiral. The present invention utilizes banana-shaped LCs to construct liquid crystal devices. The resulting devices may be manipulated such that they may be reversibly changed from a light scattering state to a transparent state and vice versa. These devices include, but are not limited to computer displays, computer monitors, signs, shutters, gratings, optical devices or any other device that transmits, reflects or modulates light of any wavelength. The reversibility between states is preferably performed with application of electric fields, but could also be accomplished thermally or mechanically.

Figure 1A:
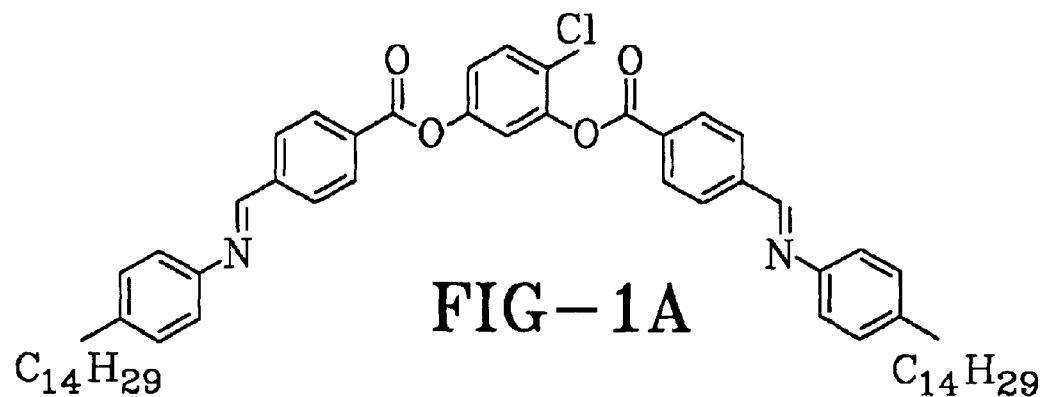
FIG. 1A is the chemical structure of 4-chloro-1,3-phenylenesbis[-4-(4-14 alkyloxyphenyliminomethyl) benzoate, a banana-shaped LC with one central phenyl ring.
Figure 1B:
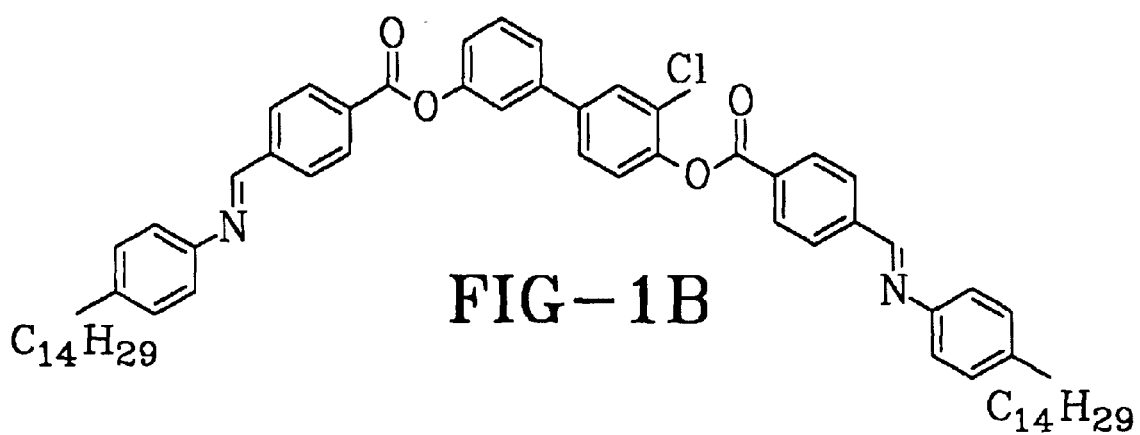
FIG. 1B is the chemical structure of 3-chloro-3,4'biphenylenebis[4-(tetradecylphenyliminomethyl) benzoate, a banana-shaped LC with a 3,4'-dihydroxybiphenyl central core.

The banana-shaped LC materials of the present invention may be described with reference to FIG. 1A and FIG. 1B, FIG. 1A shows the chemical structure of the banana-shaped LC material 4-chloro-1,3-phenylenebis [4-(4-tetradecylphenyliminomethyl) benzoate. FIG. 1B shows the chemical structure of 3-chloro-3,4'biphenylenebis[4-(tetradecylphenyliminomethyl) benzoate. As shown in FIGS. 1A and 1B, the molecules have a "bent-core" or "banana-shaped" conformation. Other suitable banana-shaped LC materials include those liquid crystals represented by formula I,

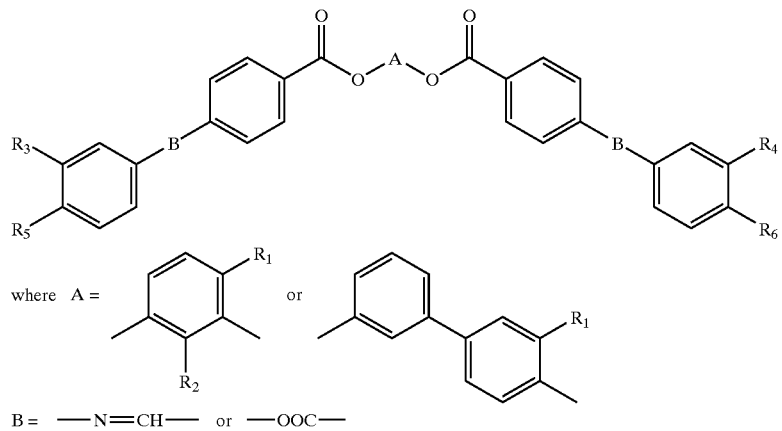

$R_1, R_2, R_3, R_4$ are independently hydrogen or a halogen, and $R_5$ and $R_6$ are independently $C_8$–$C_{16}$ alkyl or $C_8$–$C_{16}$ alkoxy. This includes 4-chloro-1,3-phenylenebis[4-4-(4-tetradecoxyphenyliminomethyl)benzoates, as well as 1,3-phenylenebis[4-4(4-n-alkylphenyliminomethyl)benzoates, 1,3-phenylenebis[4-4(4-n-alkyloxyphenyliminomethyl) benzoates, and 1,3-phenylenebis[3-fluroro-(4-n-alkyloxyphenyliminomethyl)benzoates and halogenated derivatives thereof.

It has been discovered that banana-shaped LC's can exhibit four different optical states which are antiferroelectric racemic, antiferroelectric chiral, ferroelectric racemic and ferroelectric chiral. As will be discussed in detail, these states are preferably obtained by applying electric fields of different magnitude and/or frequency. It is also believed that the magnitude and shape of the applied electric field—for example, square or triangular—may be used to obtain a desired state. All of these states are obtained without the need of alignment layers, although the use of alignment materials may be desirable for some applications.

Prior to discussing each of the four states in detail, it is believed that the terms used to name the states should be defined and that properties that characterize all of the states should also be defined. These properties include: achiral, polar plane, tilt plane, layer, domain, synclinic and anticlinic. Chiral is a term used to describe a molecule or group of molecules, for example, a layer of liquid crystal molecules, which do not exhibit mirror symmetry. Achiral, on the other hand, is a term used to describe a molecule or group of molecules which exhibit mirror symmetry. Banana-shaped liquid crystal molecules are smectic liquid crystals. That is, they arrange in layers of liquid crystal molecules with each layer having a particular average orientational order. In the case of banana-shaped liquid crystals, each layer assumes particular polar and tilt directions. The tilt plane of a layer of banana-shaped LC is the plane which shows the tilt of the molecules within the layer relative to the layer normal. The polar plane is the plane which contains the layer normal and the layer polarization.

A group of layers exhibiting a particular pattern of properties is referred to herein as a domain or phase. A domain may be either racemic or chiral. A racemic domain is one in which the chirality or "handedness" of the layers alternates between left-handed and right-handed from layer to layer. A chiral domain, however, contains layers that have the same chirality.

A domain may also be described according to the tilt direction of the layers within the domain. A domain is synclinic if all the layers within the domain tilt in the same direction relative to the layer normal. A domain is anticlinic if the direction of the tilt of the layers alternates from one layer to the next.

A domain may also be described by the presence or absence of a net polarization of the domain. A ferroelectric state is said to exist if there is a net polarization of the domain. An antiferroelectric state exists if the domain exhibits no net polarization.

Further attributes of these states and properties will become apparent as the description proceeds.

Figure 2B:
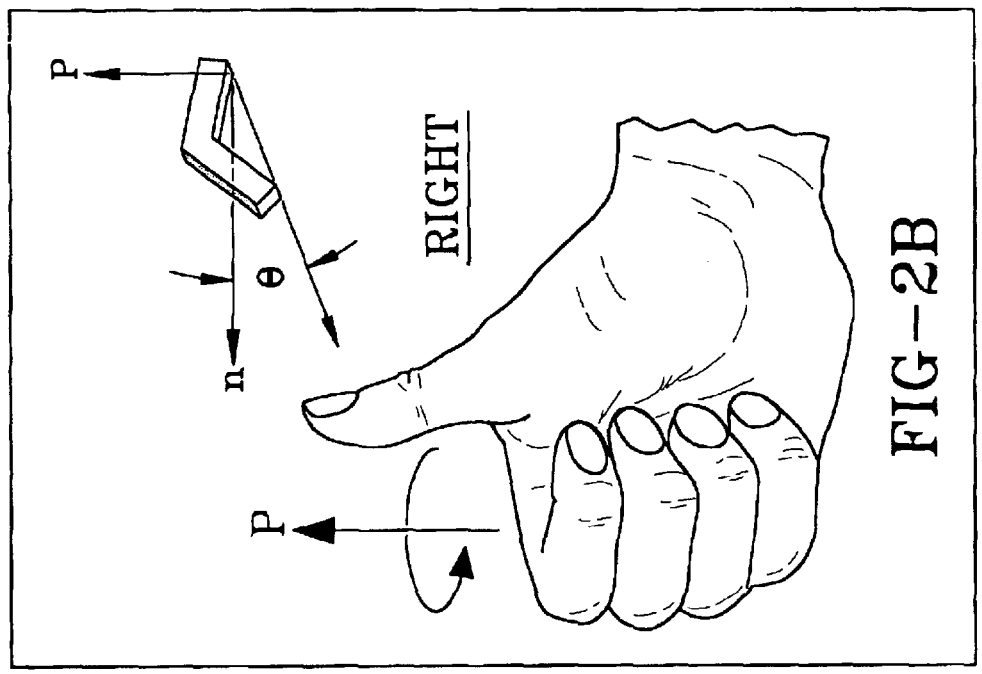
FIG. 2B is a representation of a right hand and a right-handed banana-shaped LC.
Figure 2A:
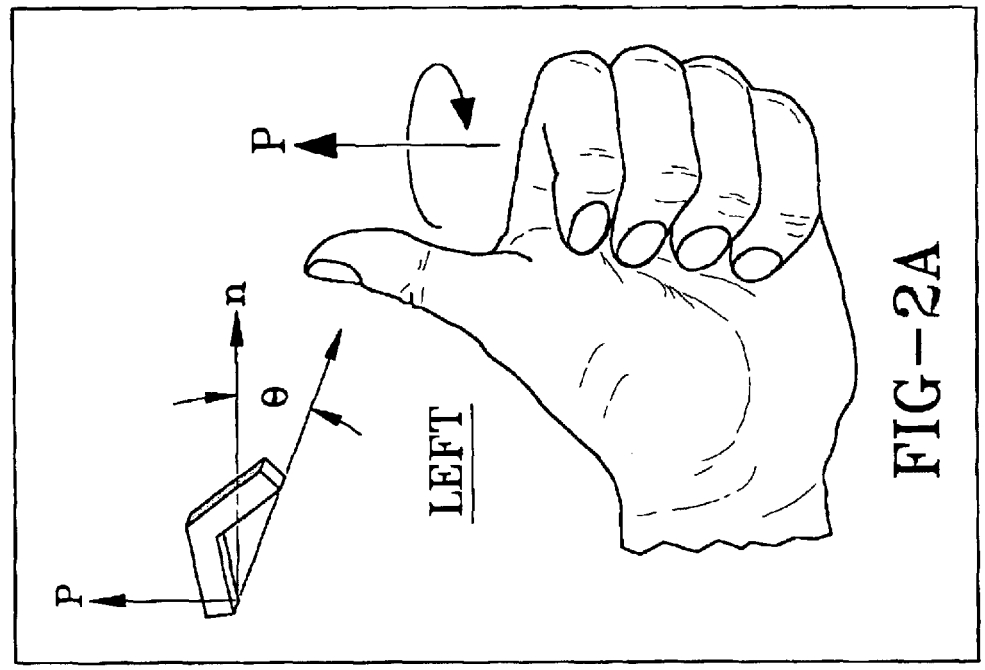
FIG. 2A is a representation of a left hand and a left-handed banana-shaped LC.

Eventhough the banana-shaped LCs of the present invention are achiral, they are capable of assembling to for chiral phases. The orientation of a left-handed and a right handed banana-shaped LC, relative to the layer in which they are situated, is illustrated in FIG. 2A and FIG. 2B, respectively. P is the layer polarization direction and n is the layer normal. The angle $\Theta$ is the angle formed between the average molecular axis of the layer and the layer normal. As shown in FIG. 2A, the average molecular axis of a left handed molecule is oriented clockwise from the layer normal where the layer polarization is perpendicular to the layer normal. This can be envisioned relative to a left hand as illustrated in FIG. 2A. If the thumb of a left hand is envisioned as pointing in the direction of layer polarization, the direction of the curling of the fingers represents the direction of the deviation of the molecular axis from the layer normal, forming angle $\Theta$. Likewise, in FIG. 2B, the average molecular axis of a right handed molecule is oriented counter-clockwise from the layer normal where the layer polarization is perpendicular to the layer normal. In this case, when the thumb of a right hand is envisioned as pointing in the direction of layer polarization, the direction of the curling of the fingers represents the direction of the deviation of the molecular axis from the layer normal, forming angle $\Theta$.

The various arrangements of phases or states of banana-shaped LC materials according to the present invention are shown in FIGS. 3A, 3B, 4A, and 4B. In these figures, the liquid crystal molecules are shown from both the tilt plane view and the polar plane view. The tilt plane view corresponds to the view as seen through a substrate of a liquid crystal cell according to the present invention while the polar plane view is a view taken from a ninety degree rotation from the tilt plane view. Stated another way, the polar plane contains the layer normal and the layer polarization (P). The tilt plane is perpendicular to P. The molecular plane is tilted with respect to the layer normal. The shading illustrates the orientation of the molecules. The stippled faces of the liquid crystals correspond to the portion of the molecule which is on the outside of the curve of the molecule while the open faces of the liquid crystals correspond to the portion of the molecule which is on the inside of the curve of the molecule. "Right" and "Left" designations in FIGS. 3 and 4 are the chirality descriptors corresponding to right- and left-handed conformations. The single dashed lines represent synclinic interfaces in the anticlinic states. The double dashed lines represents defect walls separating oppositely tilted synclinic layers. For each of FIGS. 3A–4B, only two domains containing two layers each are shown for the sake of clarity of the figures. It should be understood, however, that each of the domains may have any number of layers and that any number of domains may be present within a given liquid crystal device according to the present invention.

The layers shown in the figures are right- or left-handed, depending on the relative orientations of the two-fold symmetry axis and the tilt direction. The term two-fold symmetry axis is the axis on which the molecule may be rotated 180° with no net change in the structure of the molecule. As mentioned above, the structure is called racemic if the chirality in adjacent layers within a domain alternates, and chiral if the adjacent layers within a domain have the same handedness.

Figure 3B:
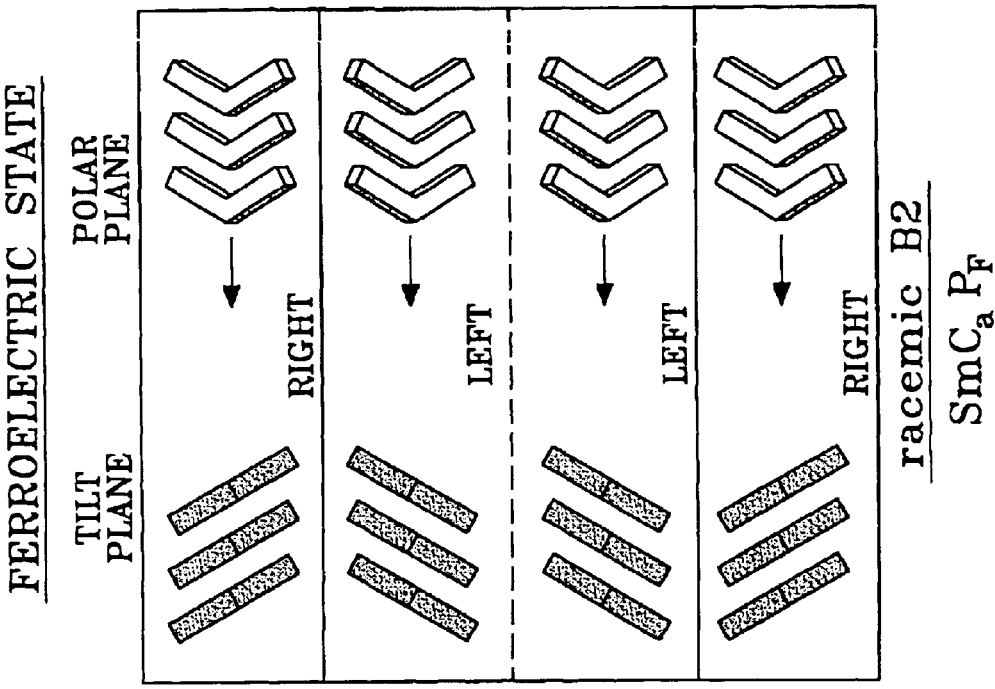
FIG. 3B is a schematic orthogonal view of the racemic B2 phase of achiral banana-shaped molecules in a ferroelectric (FE) state.
Figure 3A:
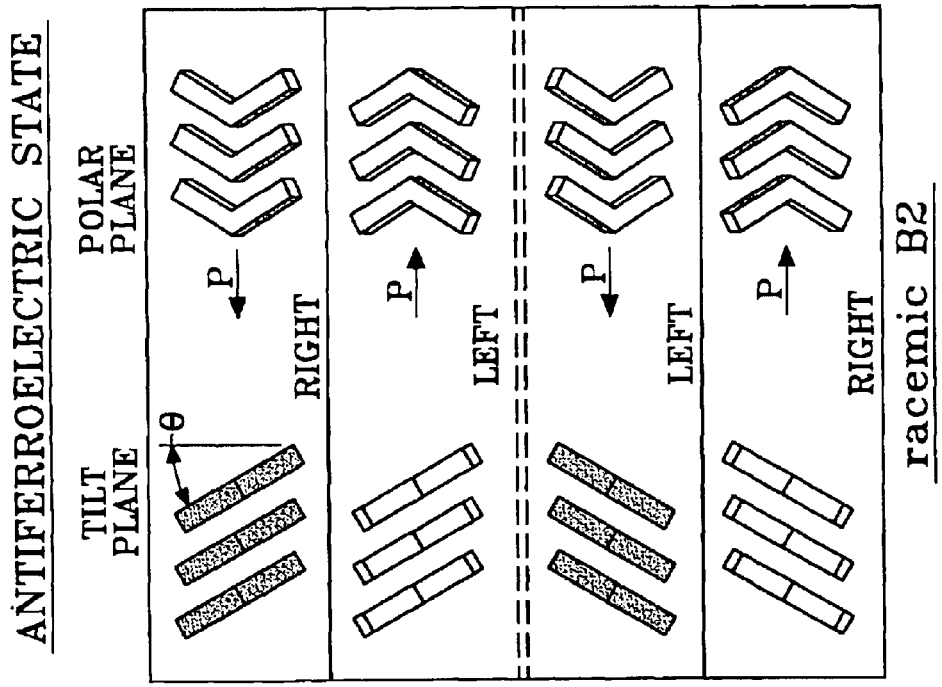
FIG. 3A is a schematic orthogonal view of the racemic B2 phase of achiral banana-shaped molecules in an antiferroelectric (AFE) state.

FIGS. 3A and 3B show the layer and director structures of a racemic B2 banana phase. Most B2 phases have an antiferroelectric (AFE) ground state. In FIG. 3A, a synclinic tilted smectic ($SmC_S$) polar antiferroelectric ($P_A$) phase is shown. The phase is synclinic, which means that the molecules in adjacent layers within the same domain tilt in the same direction, independent of the chirality of the phases. An AFE state exists when a phase exhibits no net polarization direction. In an AFE banana-shaped LC phase, the polarization director alternates 180° from one layer to the next. This arrangement can be seen in the tilt plane view of the two domains shown in FIG. 3A.

The textures of this phase usually consist of fan shaped domains with stripes a few microns wide. Each stripe has a synclinic director tilt structure with a tilt angle $\Theta$. In the subsequent stripes, the tilt directions are in the opposite direction. The different tilt directions between one stripe and another are represented by the top and bottom halves of FIG. 3A. The oppositely tilting synclinic director structures are separated by defect walls, represented by a double dashed line in FIG. 3A. These defect walls typically have a defractive index different than that of the ordered part of the material. The heterogeneity in the refractive index field can lead to a scattering of the unpolarized light, making the device opaque.

The AFE racemic state can be switched to a ferroelectric (FE) racemic state by the application of an electric field below 10 kHz. A ferroelectric state exists in a banana-shaped LC phase when there is a net polarization of a domain. In one embodiment, the change from an AFE to a FE state occurs at a field strength of about less than 10 V/$\mu$m. It has also been found that by applying a high frequency electric field, i.e. greater than about 10 kHz, the LC material switches from FE racemic to AFE racemic. By applying a low frequency electric field, i.e. below 10 kHz, the LC material switches from AFE racemic to FE racemic. FIG. 3B shows an anticlinic tilted smectic ($SmC_A$) polar ferroelectric ($P_F$) phase. The term anticlinic refers to an opposite tilt of the molecules in adjacent layers within a domain, as seen in the top and bottom parts of the tilt plane view. In this state, the optical axis is parallel to the layer normal, independent of the sign of the external electrical field. In the FE state, the defect walls of the AFE state are replaced by synclinic interfaces, which do not scatter light. Thus, a racemic structure can be switched between a scattering or opaque "off" state by removing an electric field to a transparent "on" state by applying an electric field of sufficient magnitude, just as in polymer dispersed liquid crystals (PDLCs). As noted, switch can also be accomplished with changes in frequency. In contrast to PDLCs, however, the switching time of a racemic structure from an AFE to FE state is on the order of approximately 100 microseconds ($\mu$s) or less, which is more than an order of magnitude faster than the switching time of PDLC devices.

In an FE state, the optical axis is parallel to the layer normal, independent of the sign of the external electrical field. Accordingly, no electro-optical switching is observed when a square wave field is applied to phases in FE states. That is, there is no variation in the optical modulation behavior of the LC when the electric field abruptly changes from negative to positive, or vice versa, with constant amplitude.

Figure 4B:
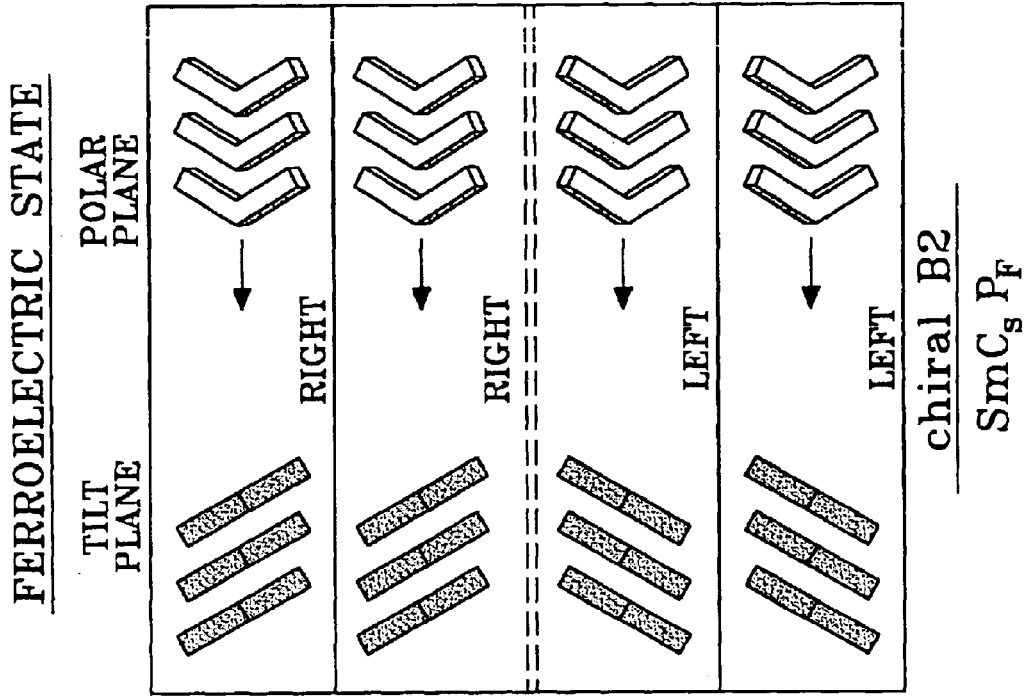
FIG. 4B is a schematic orthogonal view of the chiral B2 phase of achiral banana-shaped molecules in ferroelectric (FE) states.
Figure 4A:
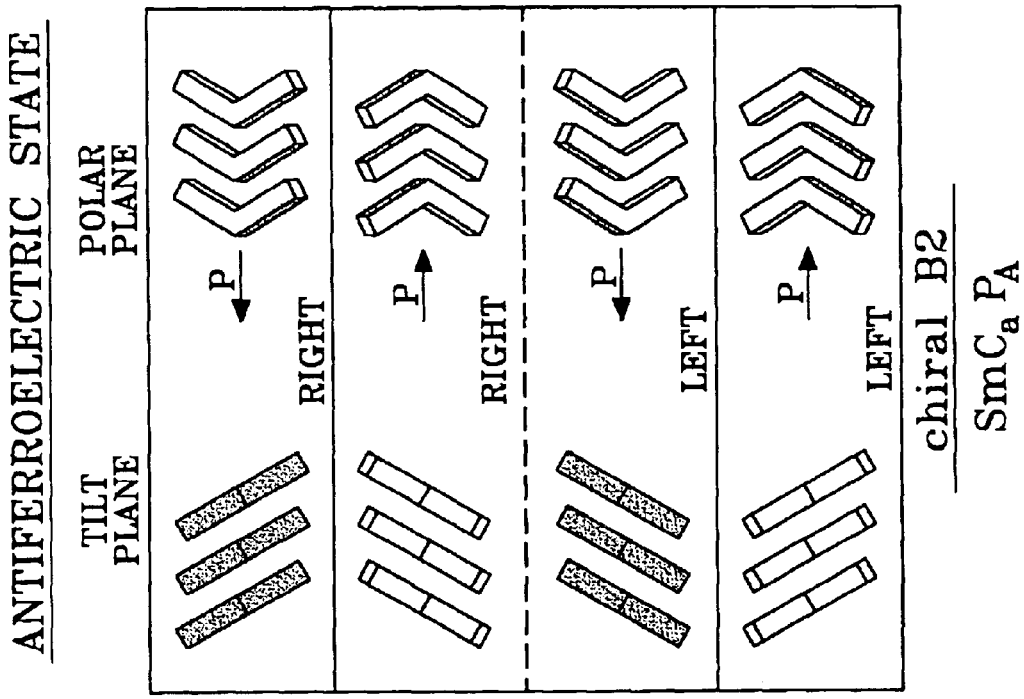
FIG. 4A is a schematic orthogonal view of the chiral B2 phase of achiral banana-shaped molecules in antiferroelectric (AFE) states.

The chiral B2 phase is shown in FIGS. 4A and 4B. In FIG. 4A, the anticlinic tilted smectic ($SmC_A$) polar antiferroelectric ($P_A$) phase is shown. As described above, the term anticlinic refers to an opposite tilt of the molecules in adjacent layers within a domain, as seen in the top and bottom halves of the tilt plane view. The optical axis is again parallel to the layer normal regardless of the handedness of the phases. Layers with different handedness are separated by only synclinic interfaces in this phase. Therefore, this state is optically clear.

In the FE state of chiral domains, the director structure becomes synclinic. Therefore the phase is described as synclinic tilted smectic ($SmC_S$) polar ferroelectric ($P_F$). In this phase, the left and right-handed synclinic domains are separated by defect walls, which scatter light. The tilt direction of this phase depends on the sign of the electric field. Therefore, electro-optical switching can be observed between crossed polarizers when a square wave electric field is applied to a chiral B2 phase.

As with the above-described racemic phase, the chiral phase can be induced to change from an AFE state to a FE state by the application of an electric field. Therefore, a chiral structure may also be switched from a transparent state to an opaque state. As opposed to a racemic state, however, a chiral state is transparent in the "off" state and scattering or opaque in the "on" state. The switching times between the chiral states are similar to the switching times of the racemic states.

In both the racemic and chiral states, the AFE state may be induced to change to a FE state by the application of an electric field. During a field-induced AFE to FE transition, the layer chirality is assumed to be conserved. This assumption is generally true for short-term application of the fields. In some cases, however, a transformation of the layer chirality can be observed. Stated another way, the $SmC_SP_A$ arrangement shown in FIG. 3A can be transformed into a $SmC_SP_F$ shown in FIG. 4A. This transformation from an AFE racemic to an AFE chiral state corresponds to a transformation from a scattering to clear state. In some materials, the AFE chiral state can then be transformed back to the AFE racemic state by application of triangular-shaped electric fields. In such an electric field, the field changes from positive to negative linearly, causing the LC material to become transiently antiferroelectric as the field passes through a zero field state. In other words, the application of the triangular field wave form to an AFE chiral state transitions the material to a FE chiral state then an FE racemic state and then to an AFE racemic state. Conversely, application of a square field wave form to an AFE racemic state transitions the LC material to the FE racemic, to the FE chiral, and then to the AFE chiral state. Both the antiferroelectric chiral and antiferroelectric racemic states are stable at zero fields. In such an embodiment, a LC device using banana-shaped LCs can be used to form a stable image without the continuous application of an electric field. In other materials, the chiral state spontaneously relaxes back to the racemic state.

Advantageously, the scattering and transparent nature of the various states described above render them useful in electro-optical display devices. Specifically, the defect walls separating synclinic domains, and their absence in the anticlinic domains, have important consequences for display applications, including faster switching times, larger viewing angles, and improved transmittance are possible. Further, the display modes can be interchanged.

Figure 5:
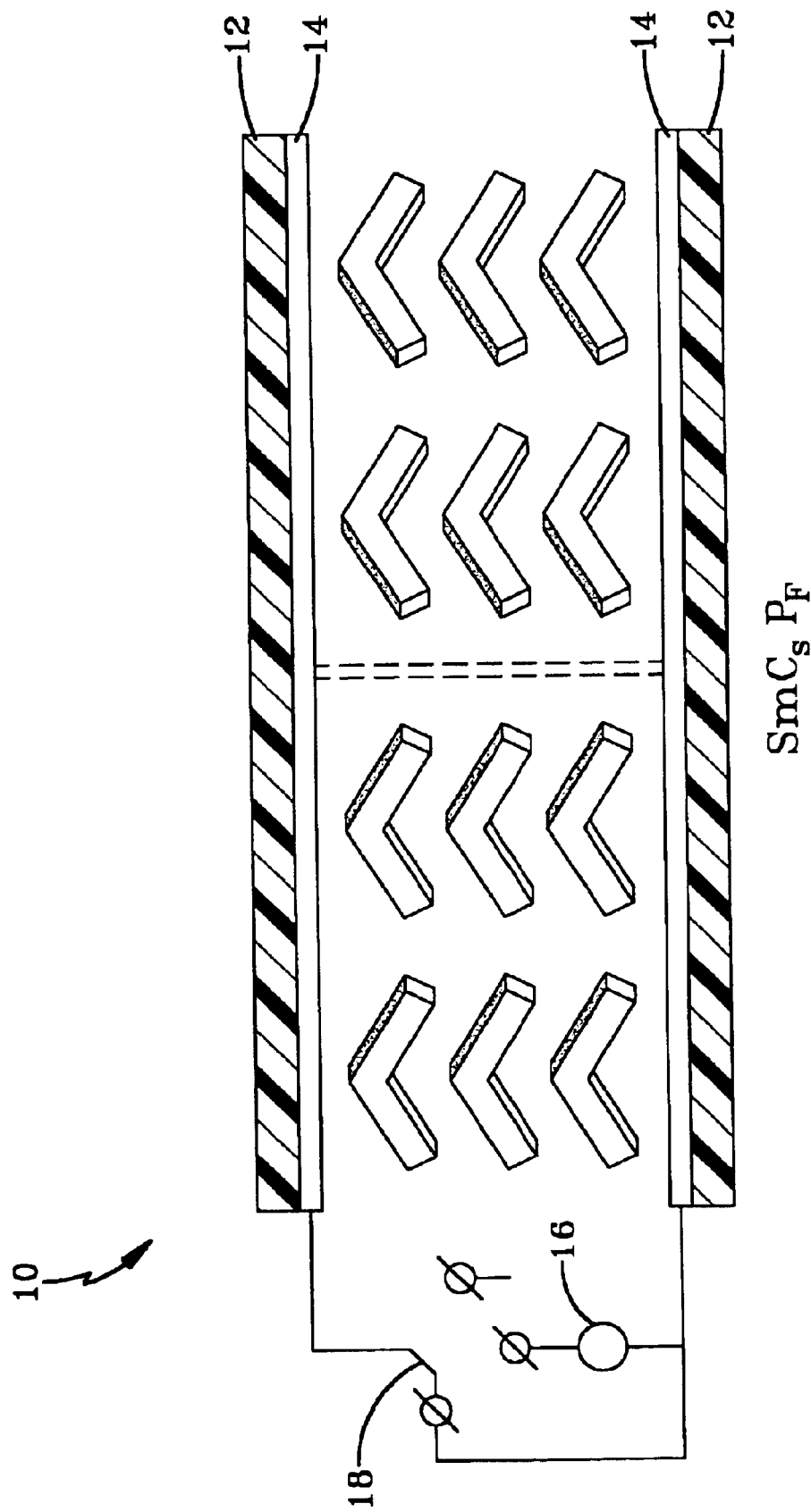
FIG. 5 is an enlarged, partial cross-sectional, schematic view of a light modulating device according to the present invention.

Liquid crystal materials suitable for use in the methods and devices of the present invention include liquid crystal materials comprising banana-shaped molecules. As shown in FIG. 5, a light modulating device 10 comprises a pair of opposed substrates 12. Substrates 12 may be glass, plastic or other material commonly known in the art. Transparent electrodes 14 may be disposed on substrates 12. In one particular embodiment, electrodes 14 are indium-tin oxide. A power source 16, is attached to electrodes 14 through a switch 18. The switch 18 may be used to connect the power source to the electrodes, to short the electrodes, or to disconnect the electrodes to store charge on them. Operation of switch 18, may be controlled by an appropriately designed electronic drive. Use of an electronic driver circuit allows particular areas of a matrix cell device to be addressed, which in turn allows high contrast between the areas. As shown in FIG. 5, a banana-shaped LC material is disposed between substrates 12 by any known method in the art, such as capillary action, for example. In FIG. 5, a $SmC_SP_F$ arrangement is shown, although other arrangements may also be induced as described herein.

In order to demonstrate the practice of the present invention, the following examples are presented. The specific materials used, the phase sequences of those materials from isotropic to liquid crystal to crystalline phases and their phase transition temperatures are shown in Table 1.

TABLE 1

| Name | Composition | Phase sequence |
|---|---|---|
| #1 | 53% B(4Cl)12 OO + 47% 3FB10q | I 130° C. B2 < 20° C. Cr |
| #2 | B14 | I 153° C. B2 130° C. B3 91° C. Cr |
| #3 | B14 + 1.5% (1:1 ZLI 811/ZLI 3786) | I 150° C. B2 127° C. B3 91° C. Cr |
| #4 | B14 + 1.5% ZLI 811 | I 150° C. B2 127° C. B3 91° C. Cr |

The material B(4Cl) 12 OO is 4-chloro-1,3-phenylenebis [4-(4-n-oxyphenylpropenoate)benzoate. B(4Cl) 12 OO is represented by formula I,

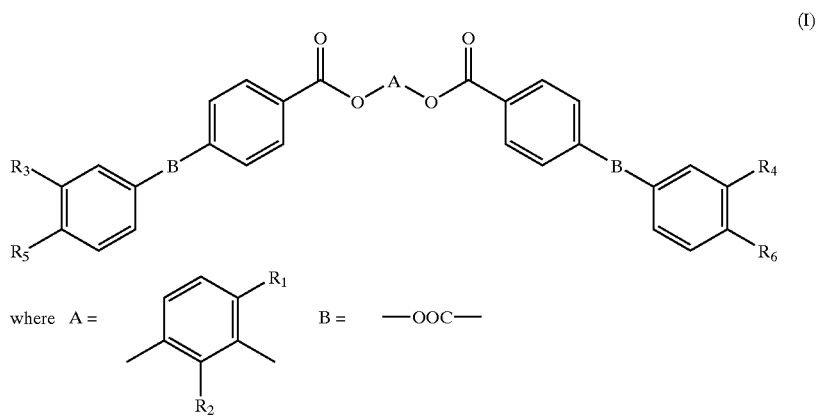

$R_1$ is chlorine, $R_2$, $R_3$, and $R_4$ are hydrogen, and $R_5$ and R6 are $C_{12}$ alkoxy. Compound B(4Cl) 12 OO forms a nematic phase in single compound form.

The material 3FB10q is 1,3-phenylenebis[3-fluoro-(4-n-decaoxyphenyliminomethyl)benzoate. 3FB10q is represented by formula I where

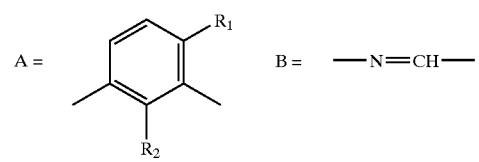

$R_1$ and $R_2$ are hydrogen, $R_3$, and $R_4$ are fluorine, and $R_5$ and $R_6$ are $C_{10}$ alkoxy. The single compound forms a so-called B7 banana-phase.

The material B14 is 1,3-phenylenebis[4-4(4-tetradecoxyphenyliminomethyl)benzoate. B14 is represented by formula I where

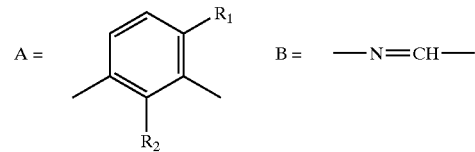

$R_1$, $R_2$, $R_3$, and $R_4$ are hydrogen, and $R_5$ and $R_6$ are $C_{14}$ alkoxy. B14 will form a B2 phase by itself.

ZLI 811 and ZLI 3786 are chiral dopants that are commercially available from Merck. The chemical structures of the two materials are the same, but they are optical antipodes. ZLI 811 has (S) chirality, whereas ZLI 3786 has (R) chirality. Materials #3 and #4 have the same structures, but #4 has chiral molecules, whereas #3 has only racemic. Material #1 has a B2 phase even at room temperature, and therefore is the most useful for practical applications. A 1:1 mixture of materials shown in FIG. 1A and FIG. 1B also forms a B2 phase at room temperature and its performance is very similar to material #1. Material #2 was used to illustrate that the disclosed electro-optical mode is not specific for composition, but for the B2 phase. Materials #3 and #4 were used to illustrate that the underlying mechanisms require racemic molecules.

The studies were carried out in ready-made cells (4-$\mu$m cells from Displaytech, 5-$\mu$m and 10 $\mu$m thick cells from EHC). All cells disclosed which are described herein are opposed substrates, either glass or plastic, with electrodes disposed thereon. The cells were filled with the aforementioned LC material and then sealed. Alignment properties may be provided on the cells.

Figure 6:
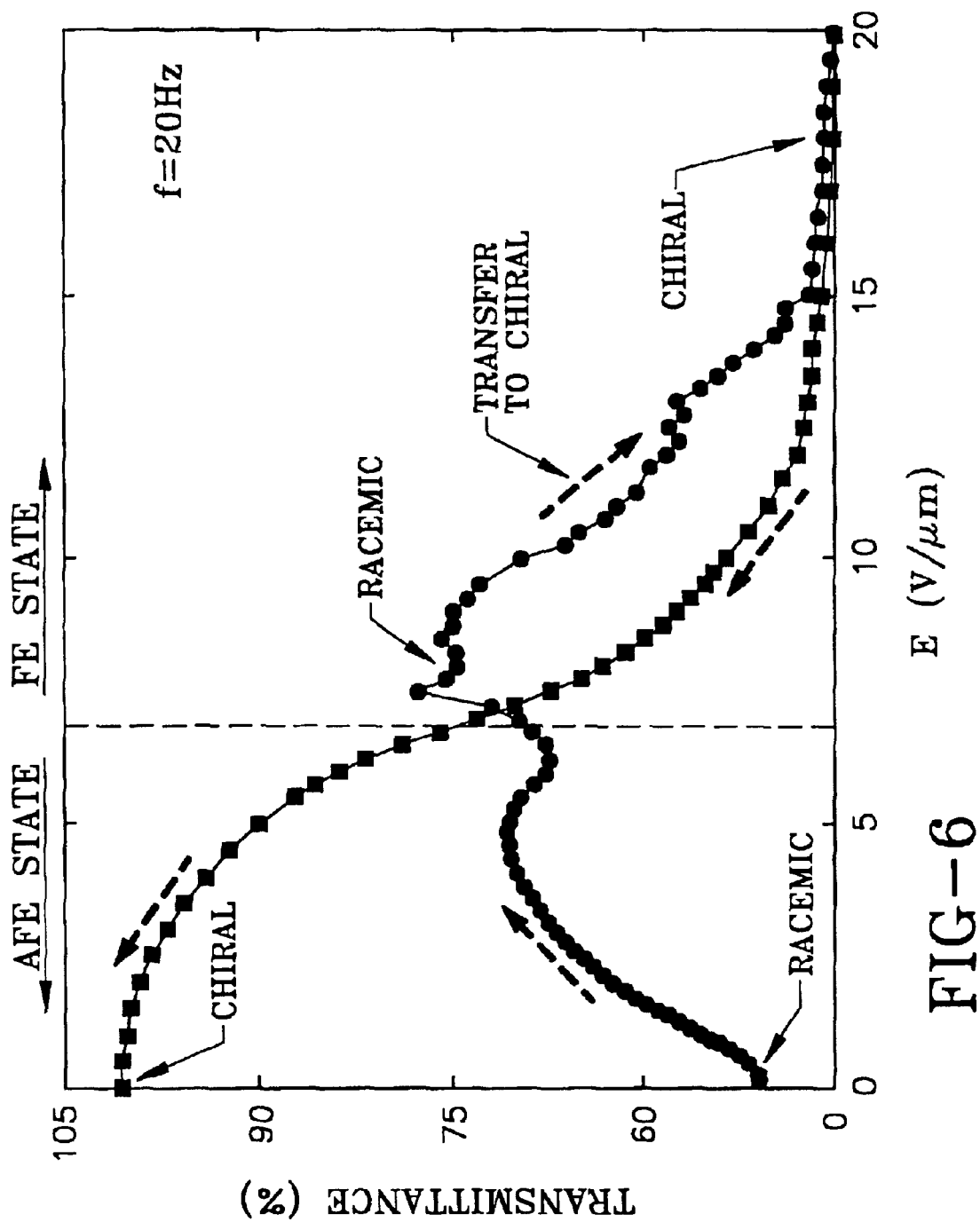
FIG. 6 is a graphical representation of the electric field dependence of the transmitted light intensity of type 1 cell (d=4-$\mu$m, T=70° C., $\lambda$=450 nm)

Upon cooling from the isotropic phase, samples #1 and #2 formed a racemic phase. The films were opaque because the textures contained defect walls separating synclinic domains with opposite director tilt. The voltage dependence of the transmitted light intensity through sample #1 is shown in FIG. 6. Circles represent the data points for material #1 in increasing fields, while squares represent the data points for the same material #1 in decreasing fields.

The virgin cell is racemic and moderately scatters the light. At increasing electric fields at a frequency of 20 Hz, the transmitted light intensity increases, especially where it switches to the FE state at E~8V/$\mu$m field. This behavior can be attributed to the disappearance of the defect walls separating synclinic domains. At E~10V/m the transmittance decreases again, and the film becomes increasingly opaque. This is because the racemic structure becomes chiral. Although not wishing to condition patentability on any particularly theory, it is believed that such a transformation can be understood as the preference for synclinic interlayer interactions. The transformation to chiral domains was simultaneously verified by studying the electro-optical switching under square wave electric fields with a polarizing microscope. At decreasing fields, the field dependence of the transmittance is monotonous. Transmittance is low at high field, than increases as the texture switches back to the AFE state. In subsequent increasing-decreasing field treatment the material stays in the chiral state and the latter curve completely reproduces. In other words, in the chiral phase, the material can work as a stable electro-optical device without hysteresis.

The transformation shown in FIG. 6 from the scattering racemic AFE state to the optically clear, stable, chiral AFE state by high fields illustrates the suitability of banana-shaped liquid crystals for use in storage devices.

FIG. 6 also shows the increase in transmittance as the banana-shaped liquid crystals go from the AFE racemic state to the FE racemic state. This characteristic makes them suitable for use in devices where PDLC-type switching devices were previously used. It should be noted that in the present example, the FE state does not become completely transparent, because of the eventual formation of the chiral state.

Another important feature of banana-shaped liquid crystals, shown in FIG. 6, is that the B2 phase can be switched between transparent and scattering states. It is remarkable that at high fields, more than 50% of the light is scattered out. This is similar to a reverse phase PDLC, which has about 60% turbidity, depending on the system.

The capability of using the banana-shaped liquid crystals displays as light shutters is illustrated in FIGS. 7A and 7B. Behind a cell filled with Material # 1, a sheet of paper is placed with the name "ALCOM" written on it. At zero field the film is transparent and the text is visible as seen in FIG. 7A. At fields E>8V/$\mu$m, the film is opaque and the text is not visible (FIG. 7B). It is important to note that the situation does not depend on the viewing angle. This is a major advantage over PDLCs.

The cells were also measured in reflection by microscope without polarizers under laser illumination. The corresponding cells are shown in FIGS. 8A and 8B which are photomicrographs of 4 $\mu$m cells of material #1 at room temperature. FIG. 8A shows a border area of the cell at zero voltage. FIG. 8B is the same cell with an applied voltage of 40V. The images represent 60 $\mu$m×60 $\mu$m areas.

Figure 9:
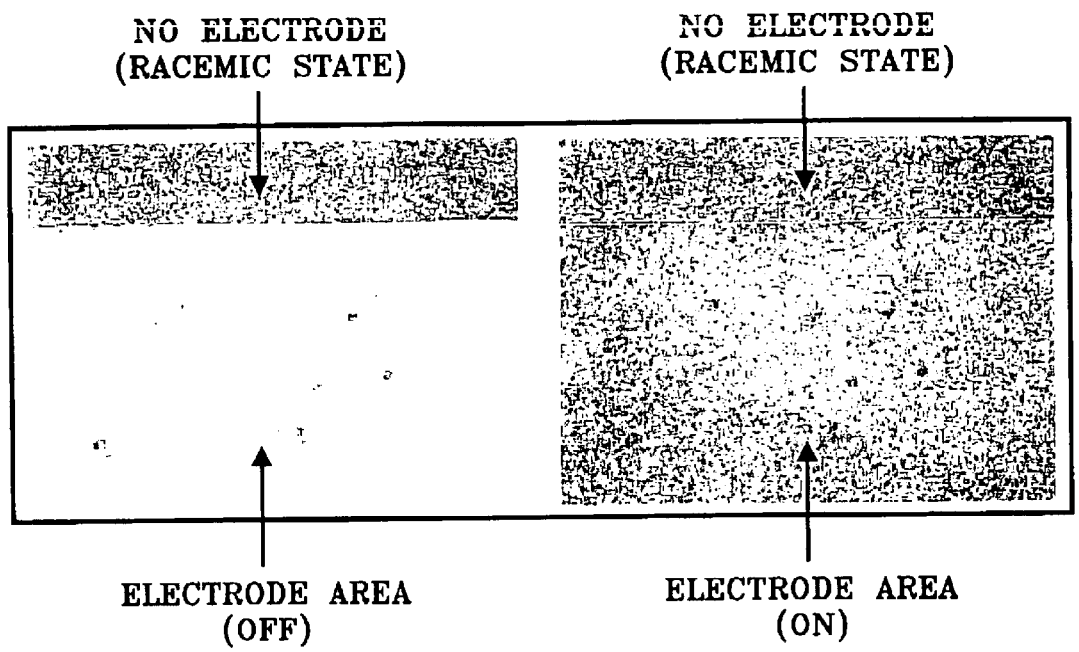
FIG. 9A is a photomicrograph of textures of a cell according to the present invention in transmission mode.
FIG. 9B is a photomicrograph of textures of a 4-$\mu$m thick cell of material #1 in transmission mode.
Figure 9B:
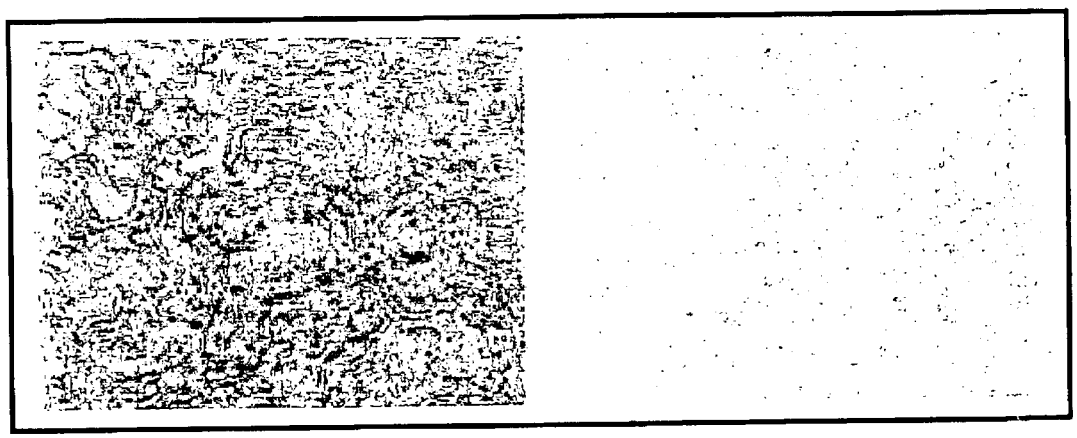

The textures of cells containing banana-shaped LCs in transmission with white light illumination are shown in FIGS. 9 and 9B. FIG. 9 is a pair of photomicrographs showing textures of a 4 $\mu$m thick cell of material #1 in transmission mode without polarizers. The temperature was 23° C. The area shown is a 500 $\mu$m×300 $\mu$m area at the edge of the electrode. The photomicrograph on the left shows the transmission properties of the cell with no electric field. The photomicrograph on the right shows the transmission properties of the cell with an electric field applied. FIG. 9B is a pair of photomicrographs of the cells shown in FIG. 9, except the photomicrographs shown in FIG. 9B are at a higher magnification. Each photomicrograph shows a 50 $\mu$m×40 $\mu$m area of the cells.

Figure 10:
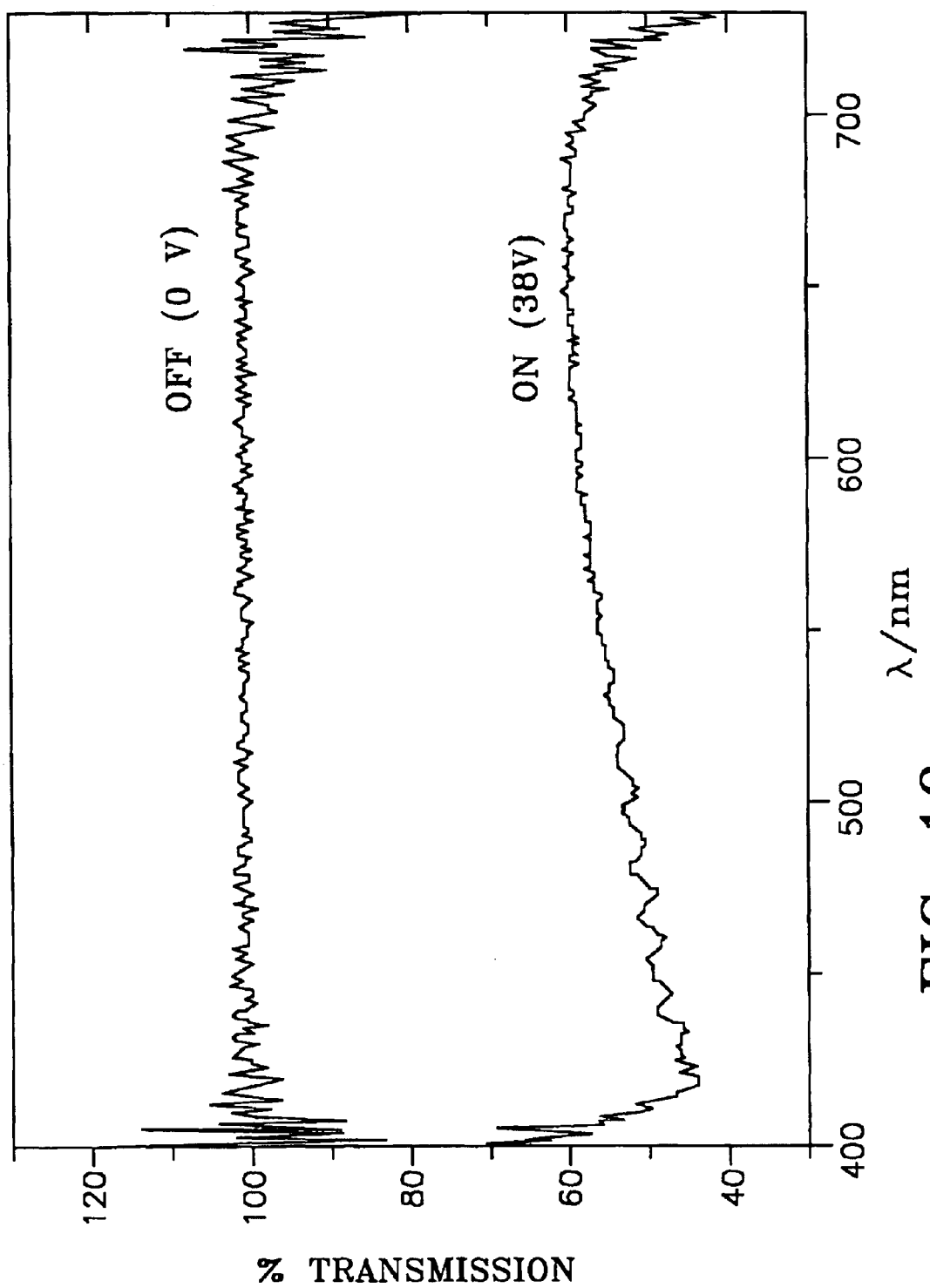
FIG. 10 is a graphical representation of the transmission spectra of a 4 $\mu$m thick cell of material #1.

The wavelength dependence of the scattering effect is shown in FIG. 10. The transmission spectra shown is for a 4 $\mu$m thick cell at material #1 at 80° C.

Figure 11A:
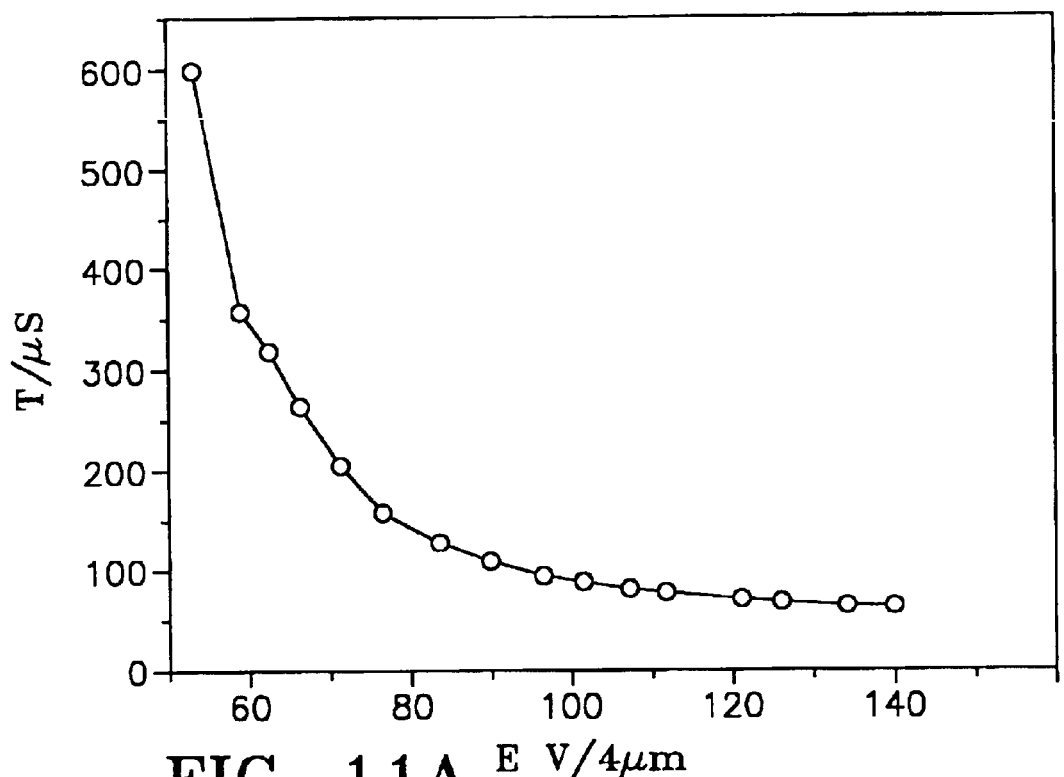
FIG. 11A is a graphical representation of the voltage dependence of the time for switching between transparent and scattering states for material #1.
Figure 11B:
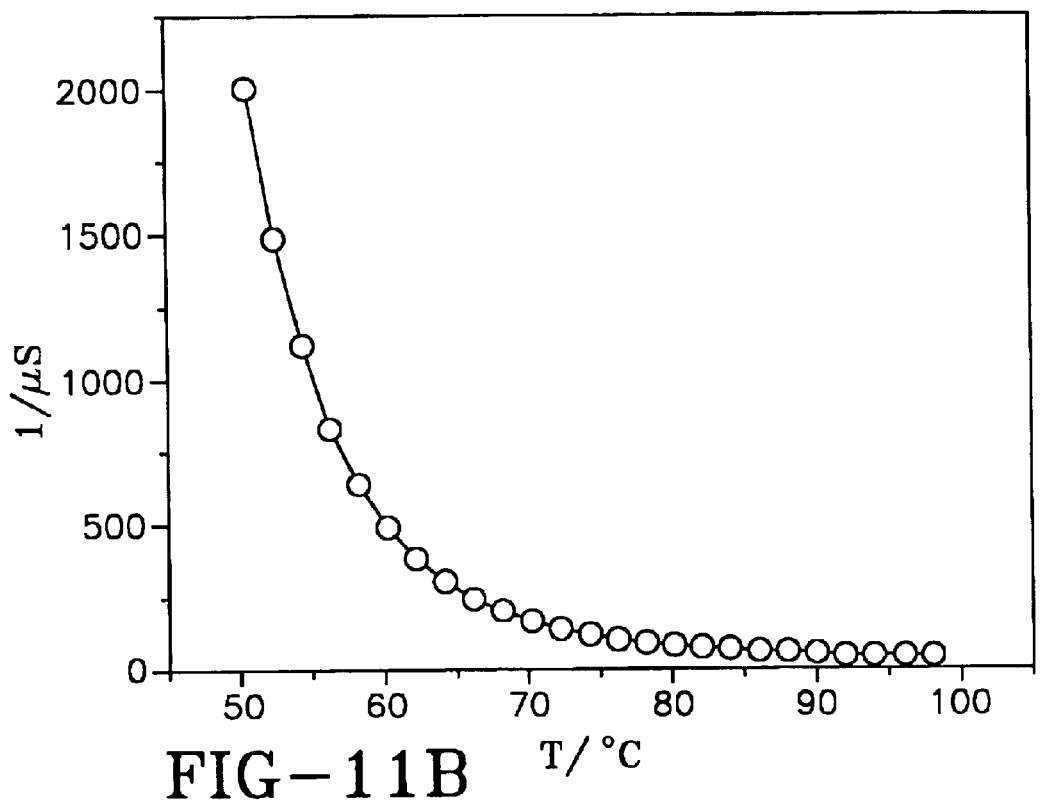
FIG. 11B is a graphical representation of the temperature dependence of the time for switching between transparent and scattering states for material #1.

The voltage and the temperature dependencies of the switching times of a LC according to the present invention are shown in FIG. 11. FIG. 11A is a graph showing switching time versus voltage for a 4 $\mu$m cell containing material #1 at 75° C. FIG. 11A shows that the switching times are generally 600 $\mu$s or less. When V/4 $\mu$m equals about 90, the switching time is about 100 $\mu$s. FIG. 11B shows a graph showing switching time versus temperature for a 4 $\mu$m cell containing material #1 at a voltage of 70V. It is seen that even as far as 70° C. below the clearing point, the switching time is below 100-$\mu$s. This is more than an order of magnitude faster than the switching time of PDLC devices.

Similar results, with somewhat weaker scattering is observed in cells containing materials #2 and #3. Transmission in the scattering state is 60% of the clear state. In addition, using these materials the chiral state can be transformed back to the racemic state by changing the electric field waveform shape from square-wave to triangular. The transitions take about 1 second with a frequency of about 1 kHz.

Figure 12A:
FIG. 12A is a photomicrograph of the texture of a cell of material B14 with 1.5% racemic dopant at 0 V.
Figure 12B:
FIG. 12B is a photomicrograph of the texture of a cell of material B14 with 1.5% racemic dopant at 30 V.
Figure 12C:
FIG. 12C is a photomicrograph of the texture of a cell of material B14 with 1.5% (S)-enantiomer dopant at 0 V.
Figure 12D:
FIG. 12D is a photomicrograph of the texture of a cell of material B14 with 1.5% (S)-enantiomer dopant at 30 V.

The scattering almost disappears in cells containing material #4, which contains chiral dopant. The transmittances in OFF and ON states differ only by 5%. This clearly proves that the scattering is connected to the presence of left- and right-handed domains. The 1.5% chiral dopant makes the material almost completely uniformly chiral. The differences between the racemic and chiral textures are presented in FIG. 12. In each of FIGS. 12A–12D, the figure is a photomicrograph of the texture of a 100-$\mu$m×70-$\mu$m area of a 4-$\mu$m cell between crossed polarizers at a temperature of 123° C. FIG. 12A is a photomicrographic representation of the texture of a of material B14 with 1.5% racemic dopant, at 0V. FIG. 12B is a photomicrograph of the texture of material B14 with 1.5% racemic dopant at 30V. FIG. 12C is a photomicrograph of the texture of material B14 with 1.5% (S)enantiomer dopant, at 0V. FIG. 12D is a photomicrograph of the texture of material B14 with 1.5% (S)-enantiomer dopant, at 30V. It can be seen that the racemic material breaks up into small domains in the ferroelectric state. The domains of the chiral materials are similar and substantially without defect lines in both the ferroelectric and the antiferroelectric state.

In one preferred embodiment of the present invention, a liquid crystal cell is provided which contains banana-shaped liquid crystal molecules in the racemic state. The switching takes place between synclinic and anticlinic structures at zero and sufficiently high ($E > E_{th}$) A.C. electric fields are applied. In appearance the film is opaque at zero field and clear under electric fields. The scattering at low fields is due to the defects separating oppositely tilted synclinic domains in the antiferroelectric state. Under sufficiently strong fields a ferroelectric state is induced where the defect walls disappear, because the oppositely tilted synclinic domains are anticlinic. The clear state is clear in any direction. As the scattering is based on the tilt separation, it is called a tilt separation mode liquid crystal device (TSM-LCD).

In a second preferred embodiment, a cell is provided which contains banana-shaped liquid crystal molecules in the chiral state. Electro-optical switching takes place between anticlinic and synclinic structures as zero and sufficiently high ($E > E_{th}$) A.C. electric fields applied. In appearance the film is clear at zero field and opaque under electric fields. At low fields the structure is antiferroelectric where there are no defect walls but only synclinic interfaces in an anticlinic background, therefore no light scattering appears. The scattering at high fields is due to the defects separating oppositely tilted synclinic domains in the ferroelectric state. Due to the overall racemic nature of the molecules the texture splits to left and right-handed synclinic domains separated by walls that scatter the light. Because the light scattering in this case is caused by defect walls that separate chiral domains, it can be called a chiral separation mode liquid crystal device (CSM-LCD).

In a third preferred embodiment, a cell is provided that contains both racemic and chiral banana-shaped structures. Application of a sufficiently high electric field produces reversible transitions between the racemic and chiral structures. Both states are stable at zero fields. The racemic state is scattering and is obtained by application of a triangular shape form and the chiral state is optically clear and is obtained by application of a rectangular shape form. These devices are suitable for optical storage devices. As this method is based on transitions between racemic and chiral states, it is called a racemic-chiral transitions mode liquid crystal device (RCT-LCD).

Although in appearance the disclosed methods and displays are similar to PDLC-s and PNLC-s, the underlying principles are completely different. There are important differences in the performances of the devices of the present invention and the PDLCs and PNLCs of the prior art. In PDLC-s and PNLC-s, scattering is due to heterogeneous materials. They involve the coexistence of solid and liquid crystal phases. In the present case, however, there is only one phase having either different director tilt, or opposite chiral handedness.

In PDLC-s and PNLC-s the switching times are over one millisecond, whereas in the devices of the present invention switching times can be 10-$\mu$s or less. This is about two orders of magnitude faster than PDLCs and PNLCs. This is due to the polar nature of these phases, which provide first order interactions between field and polarization. In addition, the viewing angle and the transmittance of the clear state are not limited when banana materials are used.

The liquid crystal devices of the present invention have commercial application possibilities in all the areas where PDLC-s are currently used. This includes privacy windows, projectors, and the like. In addition, because the performance of the display devices of the present invention is superior in several aspects, including larger viewing angle and faster switching, the application possibilities are broader. The fact that the racemic and chiral states work in opposite fashion and can be exchanged reversibly implies, for example, use in a privacy window. Such a window does not use any energy, except during switching from one state to other. A RCT-LCD could also be used in electronic newspapers, or in other optical data storage devices. The time for transformation from one state to the other requires about a second, which is about the time to turn one page over in a book. Accordingly, they are completely satisfactory for these applications. In addition, a display can be switched to a mode, in which it stays in the chiral state and would be switched at a video rate for viewing motion pictures. This capability would make it useful in cellular phones, laptops or palmtops, etc. They also can be used in guest-host type displays with dichroic dyes. Furthermore, it is envisioned that they could be used in one and two dimensional switchable gratings for beam steering, and as optical switches for information technology. During the transformation between racemic and chiral states, any state is stable, enabling multistable storage devices with gray scale properties. Gray scale may be achieved by varying the voltage magnitude or alternatively, by varying the frequency of the electric field.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of true scope and breadth of the invention, reference should be made to the following claims.

What is claimed is:

1. A liquid crystal cell comprising:
 a banana-shaped liquid crystal material in a racemic state, wherein said cell can be reversibly switched between clear and opaque states, wherein said liquid crystal material is in an anti-ferroelectric state and said cell is opaque at zero applied electric field and further wherein said liquid crystal material switches to a ferroelectric state and said cell becomes clear upon application of an electric field to said cell.

2. A liquid crystal cell according to claim 1, wherein defect walls separate synclinic domains in said liquid crystal material when said liquid crystal material is in an anti-ferroelectric state, and wherein said defect walls are replaced by synclinic interfaces when said liquid crystal material is in a ferroelectric state.

3. A liquid crystal cell according to claim 2, wherein said defect walls have a refractive index different from that of an ordered part of said liquid crystal material, resulting in a non-homogenous refractive index field for said cell when said liquid crystal material is in said anti-ferroelectric state.

4. A liquid crystal cell according to claim 1, wherein a polarization director of said liquid crystal material when in said anti-ferroelectric state alternates 180° between adjacent layers of said material.

5. A liquid crystal cell according to claim 1, wherein a switching time between said anti-ferroelectric and ferroelectric states is approximately 100 μs or less.

6. A liquid crystal cell according to claim 1, wherein said liquid crystal material will switch from the anti-ferroelectric to the ferroelectric state upon application of an electric field of less than about 10 kHz and wherein said liquid crystal material will switch from the ferroelectric to the anti-ferroelectric state upon application of an electric field of greater than about 10 kHz.

7. A liquid crystal cell according to claim 1, further comprising a pair of opposed substrates with electrodes disposed thereon.

8. A liquid crystal cell according to claim 1, wherein the banana-shaped liquid crystal material is selected from the group consisting of compounds represented by the formula:

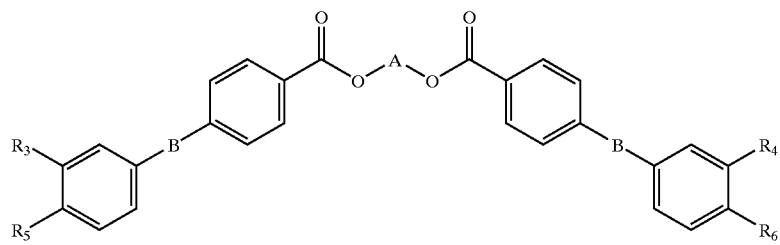

where A =

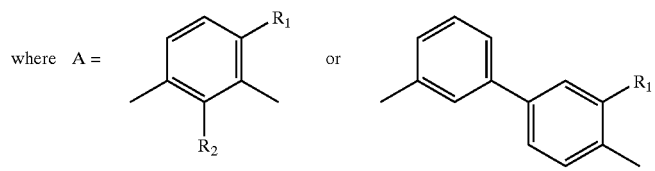

or

B = —N=CH— or —OOC— where $R_1$, $R_2$, $R_3$, and $R_4$ are independently hydrogen or a halogen, and $R_5$ and $R_6$ are independently $C_8$–$C_{16}$ alkyl or $C_8$–$C_{16}$ alkoxy.

9. A liquid crystal cell according to claim 1, wherein the banana-shaped liquid crystal molecules are selected from 4-chloro-1,3-phenylenebis[4-(4-14alkyloxyphenyliminomethyl)benzoates]; 1,3-phenylenebis[4-4(4-n-alkyphenyliminomethyl)benzoates]; 1,3-phenylenebis[4-4(4-(4-n-alkyloxyphenyliminomethyl)benzoates]; 1,3-phenylenebis[3-fluoro-(4-n-alkyloxyphenyliminomethyl)benzoates]; and halogenated derivatives thereof.

10. A liquid crystal cell comprising:
a banana-shaped liquid crystal material in a chiral state, wherein said cell can be reversibly switched between clear and opaque states, wherein said liquid crystal material is in an anti-ferroelectric state and said cell is clear at zero applied electric field and further wherein said liquid crystal material switches to a ferroelectric state and said cell becomes opaque upon application of an electric field to said cell.

11. A liquid crystal cell according to claim 10, wherein synclinic interfaces separate synclinic domains in said liquid crystal material when said liquid crystal material is in an anti-ferroelectric state, and wherein said synclinic interfaces are replaced by defect walls when said liquid crystal material is in a ferroelectric state.

12. A liquid crystal cell according to claim 11, wherein said defect walls have a refractive index different from that of an ordered part of said liquid crystal material, resulting in a non-homogenous refractive index field for said cell when said liquid crystal material is in said ferroelectric state.

13. A liquid crystal cell according to claim 10, wherein a polarization director of said liquid crystal material when in said ferroelectric state alternates 180° between adjacent layers of said material.

14. A liquid crystal cell according to claim 10, wherein a switching time between said anti-ferroelectric and ferroelectric states is approximately 100 μs or less.

15. A liquid crystal cell according to claim 10, wherein said liquid crystal material will switch from the anti-ferroelectric to the ferroelectric state upon application of an electric field of less than about 10 kHz and wherein said liquid crystal material will switch from the ferroelectric to the anti-ferroelectric state upon application of an electric field of greater than about 10 kHz.

16. A liquid crystal cell according to claim 10, wherein the banana-shaped liquid crystal material is selected from the group consisting of compounds represented by the formula:

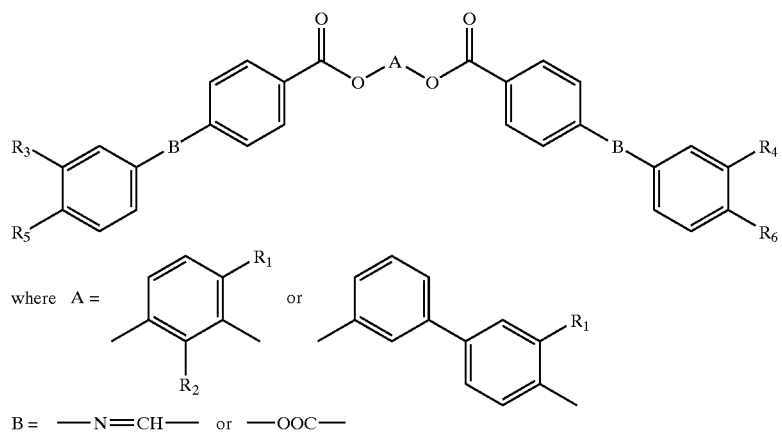

where $R_1$, $R_2$, $R_3$, and $R_4$ are independently hydrogen or a halogen, and $R_5$ and $R_6$ are independently $C_8$–$C_{16}$ alkyl or $C_8$–$C_{16}$ alkoxy.

17. A liquid crystal cell according to claim 10, wherein the banana-shaped liquid crystal molecules are selected from 4-chloro-1,3-phenylenebis[4-(4-14alkyloxyphenyliminomethyl)benzoates]; 1,3-phenylenebis[4-4(4-n-alkyphenyliminomethyl)benzoates]; 1,3-phenylenebis[4-4(4-(4-n-alkyloxyphenyliminomethyl) benzoates]; 1,3-phenylenebis[3-fluoro-(4-n-alkyloxyphenyliminomethyl)benzoates]; and halogenated derivatives thereof.

18. A liquid crystal cell according to claim 10, further comprising a pair of opposed substrates with electrodes disposed thereon.

19. A liquid crystal cell comprising:
a banana-shaped liquid crystal material present in both racemic and chiral states disposed between said substrates, wherein said cell can be reversibly switched between opaque and clear states by the application of an electric field.

20. A liquid crystal according to claim 19, wherein said racemic state is opaque, said chiral state is clear, and said switching between opaque and clear states is accomplished by reversible transitions between the racemic and chiral structures.

21. A liquid crystal according to claim 19, wherein said racemic state is obtained by application of a triangular wave shaped electric field and wherein said chiral state is obtained by the application of a rectangular wave shaped electric field.

22. An electro-optical switching device comprising a liquid crystal cell according to claim 1.

* * * * *